(12) United States Patent
Rahn

(10) Patent No.: US 8,448,565 B2
(45) Date of Patent: May 28, 2013

(54) LOOSE COFFEE TRANSFER SYSTEM

(75) Inventor: Christopher W. Rahn, Virden, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1346 days.

(21) Appl. No.: 11/670,315

(22) Filed: Feb. 1, 2007

(65) Prior Publication Data
US 2007/0181002 A1    Aug. 9, 2007

Related U.S. Application Data

(60) Provisional application No. 60/764,401, filed on Feb. 1, 2006.

(51) Int. Cl.
*A47J 31/00*    (2006.01)
*G01F 19/00*    (2006.01)

(52) U.S. Cl.
USPC ............... 99/289 R; 99/323; 73/427; 73/426; 222/461

(58) Field of Classification Search
USPC ................... 99/285, 289 R, 302 R, 304, 306, 99/307, 323; 221/66, 312 C; 73/426, 427; 222/461, 460
See application file for complete search history.

(56) References Cited

U.S. PATENT DOCUMENTS

| | | | |
|---|---|---|---|
| 2,684,624 A * | 7/1954 | Alvarez | ............................ 99/298 |
| 4,027,582 A | 6/1977 | O'Connell | |
| 4,083,295 A | 4/1978 | Hollingsworth | |
| 4,577,080 A | 3/1986 | Grossman | |
| 4,908,222 A | 3/1990 | Yu | |
| 5,010,221 A | 4/1991 | Grossman et al. | |
| 5,190,653 A | 3/1993 | Herrick et al. | |
| 5,228,488 A * | 7/1993 | Fletcher | ............................ 141/331 |
| 5,406,882 A | 4/1995 | Shaanan | |
| 5,427,233 A | 6/1995 | Zinck et al. | |
| 5,618,570 A | 4/1997 | Banks et al. | |
| 5,638,739 A | 6/1997 | Shaanan et al. | |
| 5,642,656 A | 7/1997 | Braendle | |
| 5,771,777 A | 6/1998 | Davis | |
| 5,775,206 A | 7/1998 | St-Gelais | |
| 5,799,566 A | 9/1998 | Breinlinger et al. | |
| 5,809,867 A | 9/1998 | Turner et al. | |
| 5,826,493 A | 10/1998 | Tien | |
| 5,880,441 A | 3/1999 | Hartman et al. | |
| 5,894,785 A | 4/1999 | Molinari | |
| 5,913,963 A | 6/1999 | King | |
| 5,952,028 A | 9/1999 | Lesser | |
| 6,007,853 A | 12/1999 | Lesser | |

(Continued)

FOREIGN PATENT DOCUMENTS

| | | |
|---|---|---|
| DE | 2315193 | 1/2004 |
| NL | 1020835 | 12/2003 |
| WO | WO 03/101860 | 12/2003 |

OTHER PUBLICATIONS

Rahn et al., U.S. Appl. No. 10/599,777, filed Oct. 9, 2006.

*Primary Examiner* — Reginald L Alexander
(74) *Attorney, Agent, or Firm* — Barnes & Thornburg LLP

(57) ABSTRACT

A system, method and apparatus for receiving and containing loose beverage substance with a transfer device such as a scoop or measuring device and transferring it to a corresponding holder for retaining the loose beverage substance during dispensing process. The system and apparatus facilitates orderly transfer of loose beverage substance to the holder for dispensing.

17 Claims, 3 Drawing Sheets

U.S. PATENT DOCUMENTS

| | | | |
|---|---|---|---|
| 6,035,907 A * | 3/2000 | DeCoster | 141/331 |
| 6,038,963 A | 3/2000 | Patterson et al. | |
| 6,079,318 A | 6/2000 | Davis | |
| 6,168,816 B1 | 1/2001 | Hammond | |
| 6,324,966 B1 | 12/2001 | Joergensen | |
| 6,339,985 B1 | 1/2002 | Whitney | |
| 6,354,190 B1 | 3/2002 | Haydon | |
| 6,401,597 B1 | 6/2002 | Stettes et al. | |
| 6,520,070 B1 | 2/2003 | Heczko | |
| 6,561,080 B1 | 5/2003 | Feeney | |
| 6,658,989 B2 | 12/2003 | Sweeney et al. | |
| 6,668,705 B1 * | 12/2003 | Dawn | 99/323 |
| 6,857,354 B2 * | 2/2005 | Reyhanloo | 99/289 R |
| 7,357,071 B2 * | 4/2008 | Geroult et al. | 99/285 |
| 2002/0096055 A1 | 7/2002 | Heczko | |
| 2004/0237794 A1 | 12/2004 | Fulgoni et al. | |
| 2005/0005774 A1 | 1/2005 | Fulgoni et al. | |
| 2006/0011066 A1 | 1/2006 | Bunn et al. | |

* cited by examiner

LOOSE COFFEE TRANSFER SYSTEM

RELATED APPLICATION

This application claims priority under 35 U.S.C. §119(e) to U.S. Provisional Application Ser. No. 60/764,401 filed Feb. 1, 2006, which is expressly incorporated by reference herein.

BACKGROUND

This disclosure relates generally to a system and apparatus for collecting, transferring, and in some situations, measuring beverage brewing substance for transfer to a brewing substance holder.

Devices have been developed for brewing beverages for a variety of brewing substances such as tea, or other materials. In some beverage brewing devices, a funnel or substance retaining holder is associated with the brewer. While coffee will be referred to herein below, a variety of brewing substances may be used. Loose coffee is collected by way of a spoon, measuring scoop or other device to transfer coffee from a larger ground coffee container or other coffee grinding device. In the prior brewing devices, which are used to produce a drip brewed coffee, the funnel or holder is generally a large diameter structure having a capacity which is relatively larger than the volume of coffee used in the brewing process. As a result, it is relatively uncomplicated to position the scoop or spoon full of loose coffee into the brewing holder without spilling coffee outside of the holder.

Additionally, due to the nature of the drip brewing process, a volume of water is dispensed over the loose coffee retained in the holder. Generally a sufficient volume of space is provided in the holder to accommodate a volume of water for use in brewing the beverage. Also, as the holder is generally mounted on a rail system or channels to retain the funnel underneath a spraying device or sprayhead, there is little, if any, consequence if some of the coffee were to inadvertently placed on or relative to the rim or other surfaces of the substance holder.

In contrast, the variety of smaller serving or "pod" brewing devices have been developed. Pod brewers use a pod or other form of encapsulated brewing substance retained in a filter material. The brewing substance in the filter material provides a convenient package for handling a predetermined quantity of brewing substance. The filter material provides a package or container for the brewing substance. This package allows the brewing substance to be handled prior to brewing and after brewing with little complication or mess.

Such brewing substances pre-packaged in filter material are referred to as "pods" or "sachets." Brewing substances can be compressed while packaging in the filter material or left in a generally loose condition. Pods are typically circularly shaped and have a somewhat flattened configuration. Thus, pods often are provided in the shape of a disc or puck. Pods generally range in a size from approximately 45 mm to 60 mm and contain approximately 9-11 grams of brewing substance. The typical pod is used to produce approximately 8 ounces of brewed beverage. As a result, pods are generally used in conjunction with single-serve brewers (i.e., one or two cup brewers) rather than the larger, multi-serve brewers.

Although convenient, pod use in single-serve brewers may be less desirable in some cases. For example, because the pods are prepackaged by a pod manufacturer, the selection of brewing substances is limited to the pod manufacturer's selection. As a result, a consumer or user may not be able to use his/her favorite brewing substance when utilizing a prepackaged pod. Similarly, because the pods are prepackaged, varying the strength of the resultant beverage may be accomplished by increasing or decreasing the amount of brewing water delivered to the brewing substance or the pattern of delivering water to the brewing substance.

Uniform flavor extraction from the brewing material may be more difficult to achieve with a pod. Unlike open filter brewer designs which use a cone or "cup cake" filter, brewing substance in a pod is confined within the pod and generally is not free to agitate in the brewing liquid. Instead, the brewing liquid tends to pass directly from the top of the pod to the bottom of the pod, collecting solubles as it passes through. This vertical flow pattern through the pod may result in some areas of the brewing substance being over extracted and other areas being under extracted. Accordingly, the flavor of the resulting beverage may be affected due to the non-uniform extraction of solubles, particles and other flavor characteristics from the particles of brewing substance.

Pod-type brewers are generally less conducive to use with loose coffee, coffee not packaged in filtered material compared to drip brewing type brewing. However, developments disclosed herein have been made which allow a loose beverage brewing substance to be used with a pod-type brewer. In this regard, the pod holder or drawer may be used to retain the loose beverage substance. Additional structures may be used to encapsulate or retain the beverage substance in the holder.

However, one of the complications that may arise with the use of this type of holder with loose beverage substance is that substance may be placed on surfaces of the holder. This may be a complication in that the surface of the holder may need to make a sealing contact with the brewer in order to properly brew the desired beverage. In this regard, single-serving type brewers often provide a seal between the beverage holder and the brewer so that water dispensed from the holder will flow through the holder and not leak from the holder.

Loose coffee transferred to the holder may result in accidental spilling of brewing substance on the holder. The spilled substance may interfere with the sealing between the brewer and the holder. This could cause some leakage between the holder and brewer when water is dispensed from the brewer through the brewing substance in the holder.

With the foregoing in mind, it would be desirable to provide an apparatus and method for selective transfer and containment of brewing substance used in a brewer. It would also be desirable to provide a system and apparatus to allow user to select brewing substance and to transfer the selected brewing substance to a holder for use in a pod machine.

BRIEF DESCRIPTION OF THE DRAWINGS

The organization and manner of the structure and function of the disclosure, together with the further objects and advantages thereof, may be understood by reference to the following description taken in connection with the accompanying drawings, and in which.

DESCRIPTION

Figure 1:
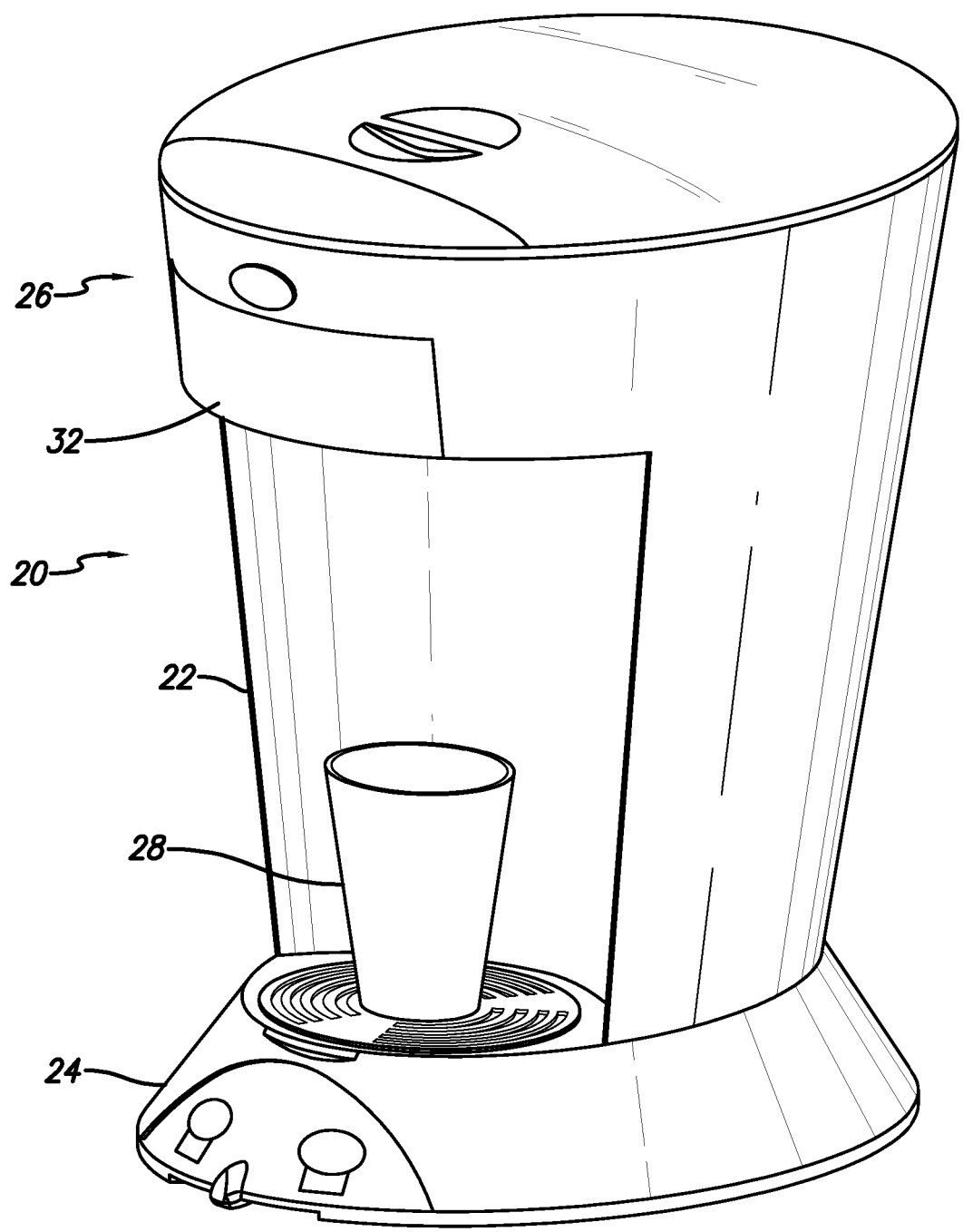
FIG. 1 is a perspective view of an embodiment of a beverage maker.

While the present disclosure may be susceptible to embodiment in different forms, there is shown in the drawings, and will be described herein in detail, one or more embodiments with the understanding that the present description is to be considered an exemplification of the principles of the disclosure and is not intended to be exhaustive or to limit the disclosure to the details of construction, methods, and the arrangements of components set forth in the following description or illustrated in the drawings.

In general, a contained loose brewing substance container for use in a beverage maker or brewer is disclosed. The container may be configured in one of many suitable configurations adapted to enable substantial containment of a brewing substance while at the same time, allowing brewing substance selection and accommodating varying amounts of the selected brewing substance. Although described for use in a single-serving single brewer, it is contemplated that the container described herein may also be utilized with other types of brewing devices, including for example at least but not limited to, a multiple cup brewer, espresso brewer, or a French-press or plunger-type beverage maker.

As shown in FIG. 1, a brewer 20 includes a body 22, a base 24, and an upper portion 26. The upper portion 26 is configured to be positioned above a container such as a cup 28 for dispensing the brewed beverage into the cup 28. It should be noted that many different configurations of a brewer 20 can be utilized in conjunction with various embodiments of the containers and transfer devices described in the disclosure. For example, in addition to single-serving brewers manufactured by Bunn-O-Matic and described herein, single-serving brewers or pod brewers are manufactured by Black & Decker, Krups, Home Café, Hamilton Beach, Mr. Coffee, Melitta, Senseo, Flavia, Keurig and Nespresso, to name a few, can be utilized in conjunction with the containers.

Terms including beverage, brewed, beverage making, dispensing, dispensed, brewing, brewed, brewing substance, brewed liquid and brewed beverage as may be used herein are intended to be broadly defined as including, but not limited to, the brewing of coffee, tea, herbs and any other brewed beverage. This broad interpretation is also intended to include, but is not limited to any process of infusing, steeping, reconstituting, diluting, dissolving, saturating or passing a liquid through or otherwise mixing or combining and/or dispensing a beverage substance with a liquid such as water without a limitation to the temperature of such liquid unless specified. This broad interpretation is also intended to include, but is not limited to beverage substances such as ground coffee, tea, herbs, liquid beverage concentrate, powdered beverage concentrate, flaked, granular, freeze dried or other forms of material including liquid, gel, crystal or other forms of beverage or food materials to obtain a desired beverage or other food product, other beverage concentrates, to obtain a desired beverage or other food.

Figure 2:
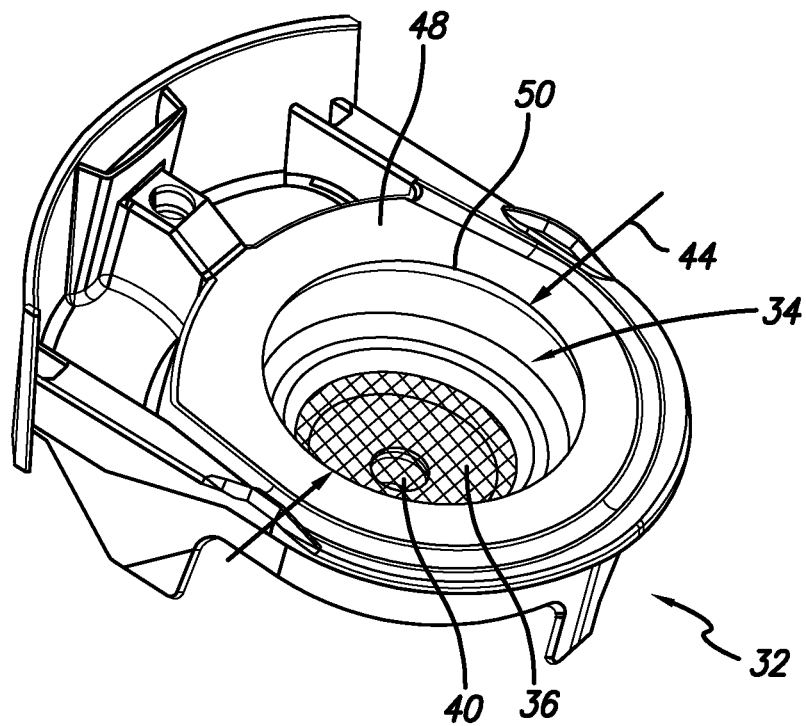
FIG. 2 is a perspective view of a beverage substance holder for use with the beverage maker.

With reference to FIG. 2, the holder 32 is shown. The holder 32 is of a drawer-type as used in the device as shown in FIG. 1. It is envisioned that a variety of holders 32 whether of the drawer-type configuration as shown in FIG. 2 or other embodiments may be used with the present disclosure. In the embodiment as shown, the drawer or holder 32 includes a holder cavity 34 in which a pod may be disposed. The pod is positioned in the cavity 34 and retained on a mesh or other filter structure 36 such that water dispensed from the upper portion 26 of the brewer 20 passes through the pod retained in the cavity 34 and through the mesh 36 whereupon it drains through a dispensing hole or drain hole 40. Additional details relating to the brewing process and pod holders are incorporated herein by reference to the additional application cited herein below. Generally, the cavity 34 is defined by a diameter 44 of the cavity 34.

The holder 32 works well with prepackaged pods but may encounter some complications when used with loose coffee. In this regard, loose coffee is spooned or scooped into the holder cavity 34. If a device, such as disclosed herein, is not used for this transfer process, coffee grounds may accumulate on the flange or sealing area 48 surrounding the rim 50 of the cavity 34. This may be detrimental to the brewing process such that a seal is formed on the surface 48 to facilitate transfer of water into the cavity 34 and the associated brewing substance retained therein during the brewing process. If the coffee grounds accumulate on the surface 48 the seal may not be maintained and some water may leak during the brewing process.

Figure 3:
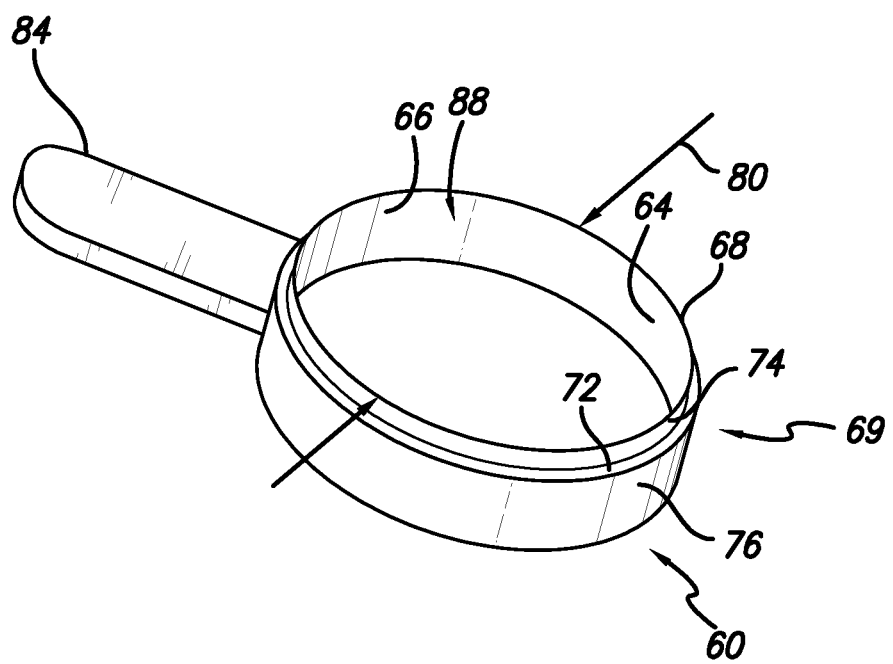
FIG. 3 is a diagrammatic illustration of a transfer device used to collect and transfer brewing substance from a container or other portion of brewing substance, collect the substance and transfer substance to the holder as shown in FIG. 2.

As such, a transfer device or scoop 60 as shown in FIG. 3 has been developed. The scoop 60 includes a wall 64 defining a device cavity 66. A first mating structure 69 is positioned on the transfer device for mating with the holder. The rim 50 of the holder is one embodiment of a second mating structure for mating with the first mating structure to facilitate alignment of the holder and transfer device. Other embodiments of the first and second mating structures may be developed to achieve the transfer as disclosed herein.

The wall includes the first mating structure shown herein including an upper rim 68 with an annular indentation or ledge 72. A portion of the wall or lip 74 is inwardly offset from an outer surface 76 of the scoop. As such, the offset surface 74 defines the indentation or ledge. An outer diameter 80 of the lip 74 is sized in dimensioned to be generally equal to or slightly smaller than the diameter 44 of the holder 32 to facilitate engagement of the lip in the cavity of the holder.

A user can scoop coffee from a container, receptacle or other holder of ground coffee. When coffee is deposited in the cavity 66 of the scoop 60, the coffee is retained therein. To transfer coffee with the scoop 60, the holder 32 is inverted over the scoop rim 68. As the outer diameter 80 of the scoop 60 is slightly smaller than or generally equal to the inner diameter 44 of the cavity 34 the lip 74 of the scoop 60 can be mated with the holder 32. By mating the upper portion or lip 74 with the cavity 34, coffee retained in the cavity 66 of the scoop can be transferred to the holder cavity 34 without minimal or no spilling, mess or complication.

Continuing with the process, the holder 32 is positioned and mated with the lip 74 of the scoop 60. Once the mating has occurred, the user inverts the scoop 60 and mated holder 32 thereby allowing gravity transfer of coffee from the cavity 66 to the cavity 34. The user can continue to grip a handle 84 to remove the scoop 60 from the holder 32. Upon removing the scoop 60 from the holder, the ground coffee previously retained in the cavity 66 of the scoop is transferred to the cavity 34 of the holder 32. Because the upper portion 74 was mated with the drawer 32, the accidental spilling or depositing of grounds on the surface 48 is minimized or eliminated.

The volume of the cavity 66 is generally sized in dimensions to be generally equal to or smaller than the cavity 34 of the holder 32. Additionally, the interior surface of the scoop 60 can be configured, by way of example and not limitation, to form a mound, cone, flat surface or other desirable surface characteristics of the coffee transferred from the scoop to the holder 32. As an additional matter, the scoop 60 and holder 32 can be produced of materials to minimize or eliminate static charges which might otherwise develop with the scooping and transfer of particulate matter such as ground coffee. The scoop may also be produced with vents, mesh or other structures which promote release of substance from the scoop and to the drawer. The scoop may also include indicia 88 corresponding to various charges or quantities of ground coffee, standard measurement units or other indicia related to quantities types, strengths or other characteristics of coffee to be disposed into a corresponding holder. For example, the indicia 88 can be marked to correspond to different holder sizes.

Figure 4:
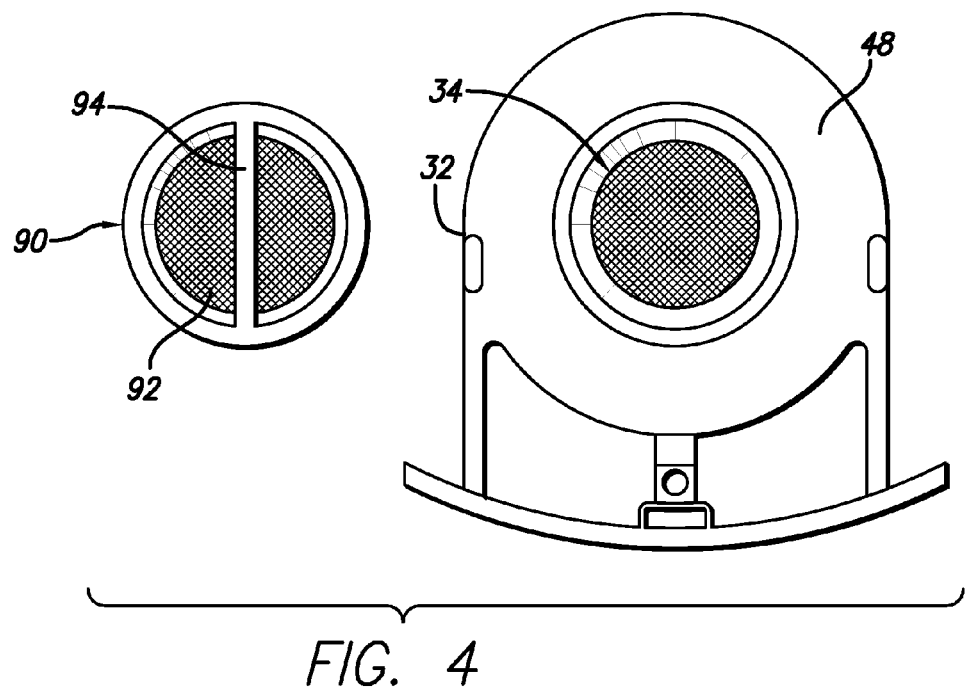
FIG. 4 is a plan view of a holder and one embodiment of a cover.
Figure 5:
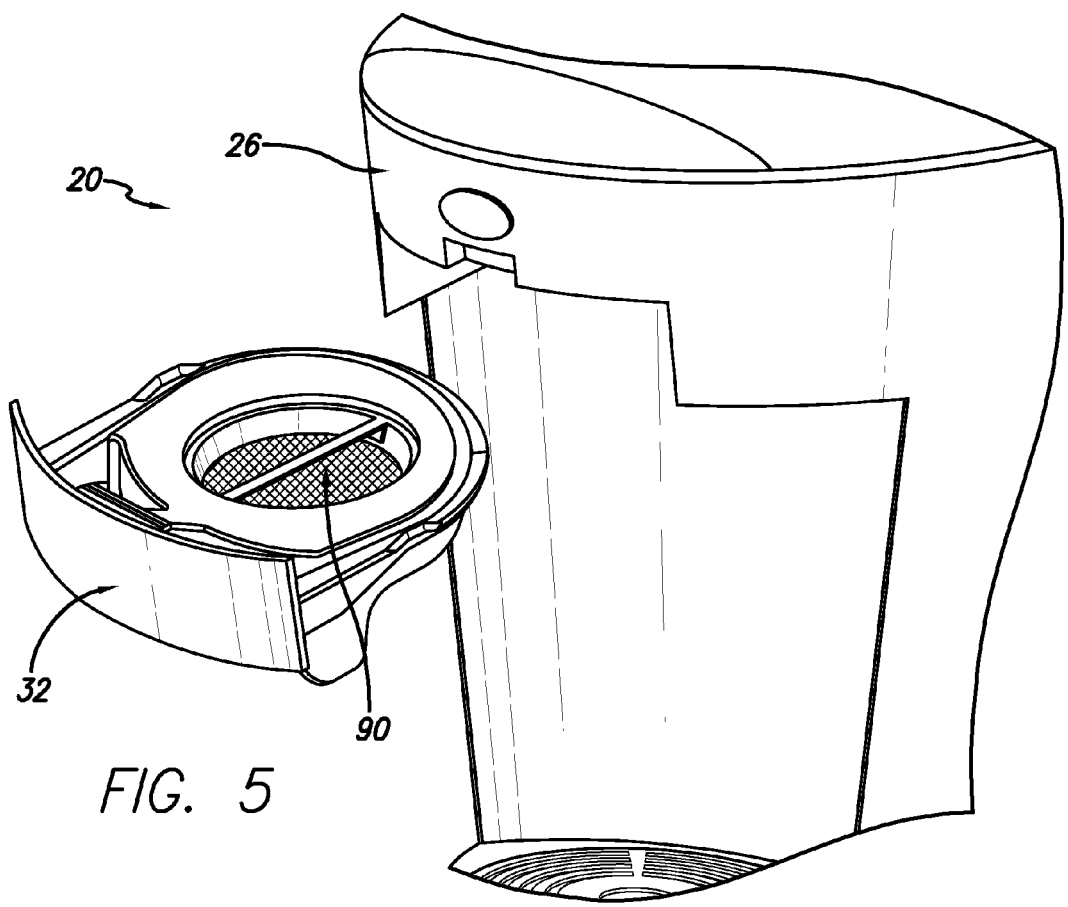
FIG. 5 is a perspective view of a holder for positioning in a beverage maker.

With further reference to FIGS. 4 and 5, an embodiment of a holder 32 including a cover 90 is provided. Additional embodiments of the cover and other devices for retaining loose coffee in the holder are shown in the additional applications noted herein and incorporated in their entirety by reference.

With reference to FIGS. 4 and 5, coffee is transferred into the cavity 34 of the holder 32. Little, if any, material is deposited on the surface 48. The cover 90 is placed over the cavity 34. In the embodiment shown, the cover includes a corresponding mesh surface 92 and gripping structure or handle 94. The assembled holder 32 including a charge of coffee retained under the cover 90 is positioned for engagement with the upper portion 26 of the brewer 20. The holder is moved into position in the upper portion 26 in accordance with the brewing process as is set forth in the various applications identified herein and incorporated by reference in their entirety.

In use, the transfer device or scoop 60 and the holder 32 are positioned for transfer of coffee into the holder 32. As described, there are various preferences and/or advantages to the use of loose coffee in a brewer which may be configured for use with prepackaged pods. The scoop 60 is used to collect a volume of loose coffee, or as noted hereinabove, various other beverage making substances. The substances are collected in the cavity 66 of the scoop 60 for transfer to the holder 32 cavity 34. Once a desired volume of the substance is collected in the cavity 66, the user inverts the holder 32 over the scoop to engage the upper lip, rim or portion 74 with the cavity 34. Once the scoop 60 has been mated with the holder 32, the combined scoop and holder can be inverted thereby transferring by gravity the loose brewing substance retained in the scoop to the holder 32. Upon inverting the holder and scoop to the position as shown in FIGS. 2 and 5, the scoop 60 can be removed by the user. The cover 90 is then placed over the cavity 34 to enclose the loose brewing substance therein for use in the brewing process. The holder 32 is positioned relative to the brewer 20 as shown in FIG. 5 and engaged therewith to facilitate brewing.

Further details of the configuration and operation of the single-serving brewer 20 can be found in related provisional applications and subsequent non-provisional applications including continuations, continuations-in-part, divisional and other related applications.

Included are the "Apparatus, System and Method for Infusing a Pre-Packaged Pod filed Feb. 9, 2004 U.S. Provisional Application No. 60/543,370, "Apparatus System and Method for Retaining Beverage Brewing Substance" filed Feb. 6, 2004 U.S. Provisional Application No. 60/542,433, and "Pod Brewer Design" filed Feb. 10, 2004. Additional information relating to adjustable controlling the single-serving brewer 20 can be found in a related provisional application entitled "Adjustable Volume Brewer" filed Nov. 7, 2003, U.S. Provisional Application No. 60/518,039. Additional information related to a spray head system and method for delivering water to the brewing assembly of the single-serving brewer 20 can be found in U.S. Provisional Application entitled "Water Delivery System, Method and Apparatus" filed Nov. 7, 2003, U.S. Provisional Application No. 60/518,411. Additional information related to beverage making apparatus which uses loose coffee and related devices and methods of use can be found in U.S. Provisional Application entitled "A Beverage Making Apparatus and Method Using Loose Beverage Substances" filed Apr. 2, 2004, U.S. Provisional Application No. 60/560,033. Information about a pod holder with a removable insert can be found in U.S. Provisional Application entitled "Pod Holder with Removable Insert" filed May 28, 2004, U.S. Provisional Application No. 60/575,235. Information about a beverage making apparatus which uses loose coffee and related devices and methods of use can be found in U.S. Provisional Application entitled "A Beverage Making Apparatus and Method Using Loose Beverage Substance" filed Sep. 1, 2004, U.S. Provisional Application No. 60/606,233, and U.S. application Ser. No. 11/101,321 entitled "Loose Coffee Apparatus System and Method" filed Apr. 7, 2005. Each of the above-referenced applications and the materials set forth therein is incorporated herein by reference in its entirety.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicant has provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and claims.

The invention claimed is:

1. A beverage brewing substance transfer device for use with a beverage brewing substance holder of a beverage maker, the beverage brewing substance holder defining at least a portion of a brewing chamber of the beverage maker for use in brewing a beverage, the beverage brewing substance transfer device collecting, retaining and transferring beverage brewing substance to the beverage brewing substance holder, the beverage brewing substance transfer device comprising:

a wall defining a cavity therein;

a rim of the wall defining a transfer mouth, the transfer mouth being the only passage for beverage brewing substance into and out of the beverage brewing substance transfer device;

the beverage brewing substance holder having a rim defining a holder mouth; and a first mating structure on the rim of the beverage brewing substance transfer device mating directly and dimensionally with the rim of the beverage brewing substance holder mouth to allow the beverage brewing substance transfer device to mate with the beverage brewing substance holder to facilitate transfer of beverage brewing substance from the beverage brewing substance transfer device to the beverage brewing substance holder.

2. The transfer device for use with a beverage substance holder of a beverage maker as in claim 1, further comprising measurement indicia on the wall of the transfer device inside the cavity for measuring substance in the cavity of the transfer device.

3. The transfer device for use with a beverage substance holder of a beverage maker as in claim 1, the first mating structure further comprising a lip and a corresponding ledge, at least a portion of the lip sized and dimensioned for engaging an inside portion of the holder rim for mating the transfer device with the holder.

4. The transfer device for use with a beverage substance holder of a beverage maker as in claim 1, further comprising a handle extending from the wall.

5. A device for substance transfer and brewing comprising
  a beverage brewing substance transfer device in combination with
  a beverage brewing substance holder of a beverage maker, the holder defining at least a portion of a brewing chamber of the beverage maker for use in brewing a beverage,
  a wall defining a device cavity of the transfer device;
  a rim of the wall defining a transfer mouth of the transfer device, the transfer mouth being the only passage into and out of the transfer device;
  a first mating structure on the rim of the transfer device for mating with the holder;
  the holder defining a holder cavity;
  a rim on the holder defined by the holder cavity; and
  a second mating structure on the rim of the holder for mating directly and dimensionally with the first mating structure of the transfer device to help align the transfer device and holder to facilitate transfer of a beverage substance.

6. The transfer device in combination with the beverage substance holder of a beverage maker as in claim 5, further comprising measurement indicia on the wall of the transfer device inside the cavity for measuring substance in the device cavity.

7. The transfer device in combination with the beverage substance holder of a beverage maker as in claim 5, the first mating structure further comprising a lip and a corresponding ledge, at least a portion of the lip sized and dimensioned for engaging an inside portion of the holder rim in the holder cavity for mating the transfer device with the holder.

8. The transfer device in combination with the beverage substance holder of a beverage maker as in claim 5, further comprising a handle extending from the wall.

9. The transfer device in combination with the beverage substance holder of a beverage maker as in claim 5, further comprising a cover being sized and dimensioned for mating with the cavity of the holder for covering beverage substance disposed in the holder cavity.

10. The transfer device in combination with the beverage substance holder of a beverage maker as in claim 9, further comprising the cover being at least partially water permeable for receiving water from a beverage maker for producing a beverage therefrom.

11. A device for substance transfer and brewing comprising:
  a beverage maker having a beverage brewing substance holder comprising at least a portion of a brewing chamber in combination with
  a beverage brewing substance transfer device for collecting, retaining and transferring beverage brewing substances to the beverage brewing substance holder comprising
  a wall defining a device cavity of the transfer device;
  a rim of the wall defining a transfer mouth of the transfer device, the transfer mouth being the only passage into and out of the transfer device;
  a first mating structure on the rim of the transfer device generally proximate the mouth;
  the holder defining a holder cavity;
  a rim on the holder defined by the holder cavity; and
  a second mating structure on the rim of the holder for mating directly and dimensionally with the first mating structure of the transfer device to help align the transfer device and holder to facilitate transfer of a beverage substance and facilitate transfer of beverage substance from the transfer device to the holder.

12. The beverage maker having a beverage substance holder in combination with a transfer device as in claim 11, further comprising measurement indicia on the wall of the transfer device inside the cavity for measuring substance in the device cavity.

13. The beverage maker having a beverage substance holder in combination with a transfer device as in claim 11, the first mating structure further comprising a lip and a corresponding ledge, at least a portion of the lip sized and dimensioned for engaging an inside portion of the holder rim in the holder cavity for mating the transfer device with the holder.

14. The beverage maker having a beverage substance holder in combination with a transfer device as in claim 11, further comprising a handle extending from the wall.

15. The beverage maker having a beverage substance holder in combination with a transfer device as in claim 11, further comprising a cover being sized and dimensioned for mating with the cavity of the holder for covering beverage substance disposed in the holder cavity.

16. The beverage maker having a beverage substance holder in combination with a transfer device as in claim 15, further comprising the cover being at least partially water permeable for receiving water from a beverage maker for producing a beverage therefrom.

17. A method of placing a beverage brewing substance in a beverage brewing substance holder for use in a beverage maker, the transfer device having a wall defining a cavity therein for retaining a quantity of beverage substance, a rim of the wall defining a transfer mouth, the transfer mouth being the only passage into and out of the transfer device, the holder defining at least a portion of a brewing chamber of the beverage maker for use in brewing a beverage, the holder having a cavity for receiving a quantity of beverage substance, the method comprising the steps of:
  placing beverage brewing substance in the transfer device cavity;
  placing the holder cavity over the transfer device cavity;
  mating the holder directly and dimensionally to the transfer device;
  inverting the mated holder and transfer device for disposing beverage brewing substance retained in the transfer device cavity into the holder cavity; and
  removing the transfer device from the holder.

* * * * *